(12) United States Patent
Kimchi et al.

(10) Patent No.: US 8,494,215 B2
(45) Date of Patent: Jul. 23, 2013

(54) AUGMENTING A FIELD OF VIEW IN CONNECTION WITH VISION-TRACKING

(75) Inventors: Gur Kimchi, Bellevue, WA (US); Avi Bar-Zeev, Redmond, WA (US); Brett D. Brewer, Sammamish, WA (US); Roman Ormandy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 12/398,280

(22) Filed: Mar. 5, 2009

(65) Prior Publication Data

US 2010/0226535 A1     Sep. 9, 2010

(51) Int. Cl.
*G06K 9/00* (2006.01)

(52) U.S. Cl.
USPC .......................................................... 382/103

(58) Field of Classification Search
USPC .................. 382/100–107; 345/7, 8, 156, 419, 345/420, 427, 632, 633, 629; 702/150; 348/135, 348/E7.085, E13.023, E13.041, E13.002, 348/E13.014; 701/45
See application file for complete search history.

(56) References Cited

U.S. PATENT DOCUMENTS

| | | | |
|---|---|---|---|
| 5,844,824 A | 12/1998 | Newman | |
| 5,886,683 A | 3/1999 | Tognazzini | |
| 6,094,625 A * | 7/2000 | Ralston | 702/150 |
| 6,199,014 B1 | 3/2001 | Walker et al. | |
| 6,321,158 B1 | 11/2001 | DeLorme et al. | |
| 6,424,910 B1 | 7/2002 | Ohler et al. | |
| 6,778,171 B1 | 8/2004 | Kikinis | |
| 6,803,928 B2 | 10/2004 | Bimber et al. | |
| 7,117,254 B2 | 10/2006 | Lunt et al. | |
| RE40,014 E | 1/2008 | Edwards | |
| 7,389,179 B2 | 6/2008 | Jin et al. | |
| 7,395,507 B2 | 7/2008 | Robarts et al. | |
| 7,460,953 B2 | 12/2008 | Herbst et al. | |
| 7,583,275 B2 | 9/2009 | Neumann et al. | |
| 8,237,791 B2 | 8/2012 | Chen et al. | |
| 2002/0080094 A1 | 6/2002 | Biocca et al. | |

(Continued)

FOREIGN PATENT DOCUMENTS

WO    2006110472 A2    10/2006

OTHER PUBLICATIONS

The Information Week, "Dipity Do Social Timelines" Fritz Nelson's Instigator, Mar. 4, 2008, http://www.informationweek.com/blog/main/archives/2008/03/dipity_do_socia.html, 2 pages.

(Continued)

*Primary Examiner* — Atiba O Fitzpatrick
(74) *Attorney, Agent, or Firm* — Shook, Hardy & Bacon L.L.P.

(57) ABSTRACT

The claimed subject matter relates to an architecture that can employ vision-monitoring techniques to enhance an experience associated with elements of a local environment. In particular, the architecture can establish gaze- or eye-tracking attributes in connection with a user. In addition, a location and a head or face-based perspective of the user can also be obtained. By aggregating this information, the architecture can identify a current field of view of the user, and then map that field of view to a modeled view in connection with a geospatial model of the environment. In addition, the architecture can select additional content that relates to an entity in the view or a modeled entity in the modeled view, and further present the additional content to the user.

20 Claims, 13 Drawing Sheets

U.S. PATENT DOCUMENTS

| | | | |
|---|---|---|---|
| 2003/0209893 A1* | 11/2003 | Breed et al. ............... 280/735 |
| 2004/0093466 A1 | 5/2004 | Hull |
| 2004/0105573 A1 | 6/2004 | Neumann et al. |
| 2004/0135744 A1 | 7/2004 | Bimber et al. |
| 2005/0122308 A1 | 6/2005 | Bell et al. |
| 2006/0004512 A1 | 1/2006 | Herbst et al. |
| 2006/0028400 A1* | 2/2006 | Lapstun et al. ............... 345/8 |
| 2006/0050993 A1 | 3/2006 | Stentiford |
| 2006/0109237 A1 | 5/2006 | Morita et al. |
| 2006/0227047 A1 | 10/2006 | Rosenberg |
| 2006/0241857 A1 | 10/2006 | Onishi et al. |
| 2007/0124157 A1 | 5/2007 | Laumeyer et al. |
| 2007/0194902 A1 | 8/2007 | Blanco et al. |
| 2007/0214141 A1 | 9/2007 | Sittig |
| 2007/0244633 A1 | 10/2007 | Phillips et al. |
| 2007/0273610 A1 | 11/2007 | Baillot |
| 2008/0040370 A1 | 2/2008 | Bosworth et al. |
| 2008/0114808 A1 | 5/2008 | Morita et al. |
| 2008/0132251 A1 | 6/2008 | Altman et al. |
| 2008/0262714 A1 | 10/2008 | Abramovich Ettinger |
| 2008/0294663 A1 | 11/2008 | Heinley et al. |
| 2009/0008450 A1 | 1/2009 | Ebert et al. |
| 2009/0300100 A1 | 12/2009 | Freer |
| 2010/0125812 A1* | 5/2010 | Hartman et al. ............... 715/848 |
| 2010/0313146 A1 | 12/2010 | Nielsen et al. |
| 2011/0264743 A1 | 10/2011 | Baumert et al. |

OTHER PUBLICATIONS

TechCrunch, "FriendFeed to Aggregate Social Network Data Into a Single Feed", Oct. 1, 2007, http://www.techcrunch.com/2007/10/01/friendfeed-taking-a-poke-at-the-monster-social-networks/, 19 pages.

Mashable: All That's New on the Web, "Show Off Your Activity Stream on a Timeline With Dipity 2.0", Sep. 5, 2008, http://mashable.com/2008/09/05/dipity-2/, 5 pages.

Non-Final Office Action mailed Oct. 11, 2011 regarding U.S. Appl. No. 12/398,109, 18 pages.

Final Office Action mailed Mar. 20, 2012 regarding U.S. Appl. No. 12/398,109 25 pages.

Guangzhou Yeroo Printing Technology Co., Magic Mirror—Jan. 2002 http://www.3dyeroo.com/index.htm, last accessed Sep. 4, 2008, 2 pages.

Guangzhou 3d yeroo Co., Ltd., Magic Mirror Lightbox http://www.bikudo.com/product_search/details/39250/magic_mirror_lightbox.html#desc. Last accessed Sep. 3, 2008, 3 pages.

2007 Finalist Teams: 2007 Intel + Berkeley Technology Entrepreneurship Challenge Participating Teams; http://www.entrepreneurshipchallenge.org/2007%20Teams,htm, last accessed Sep. 3, 2008, 4 pages.

Bishopsgate Communications Ltd., Avery Dennison—Le Coq Sportif is Developing Radically Innovative Retail Applications Based on NFC (Near Field Communication) and RFID Technologies, May 19, 2008, http://www.bishopsgatecommunications.com/news_details.php?id=343, last accessed Sep. 3, 2008, 3 pages.

Stanford Graduate School of Business, Jackson Library, Jackson Blog, Nokia's Primary Market, Oct. 31, 2007, Jackson Blog. http://www.standford.edu/ group/jacksonlibrary/blog/2007/10/, last accessed Sep. 3, 2008, 10 pages.

IT Reseller Magazine, Paxar Rolls out New Prototype RFID Mirror, Nov. 21, 2006, http://www.itrportal.com/absolutenm/templates/article-rfid.aspx?articleid=3685& zoneid=49, last accessed Sep. 3, 2008, 2 pages.

Non-Final Office Action mailed Dec. 16, 2011 regarding U.S. Appl. No. 12/486,964 21 pages.

Oyekoya, Oyewole et al., "An Eye Tracking Interface for Image Search", Retrieved on Jan. 9, 2009, 1 page http://www.cs.ucl.ac.uk/staff/W.Oyekoya/ETRAWole.pdf.

Oyekoya, Oyewole et al., "A Performance comparison of Eye Tracking and Mouse Interfaces in a Target Image Identification Task", European Workshop on the Integration of Knowledge, Semantics & Digital Media Technology, London, UK, Nov. 30-Dec. 1, 2005, 6 pages http://www.ee.ucl.ac.uk/~fstentif/OyekoyaStentifordEWIMT2005.pdf.

Puolamaki, K. et al., "Combining Eye Movements and Collaborative Filtering for Proactive Information Retrieval", SIGIR'05, Aug. 15-19, 2005, Salvador, Brazil, 8 pages http://www.cis.hut.fi/projects/mi/papers/sigir05.pdf.

Final Office Action mailed Aug. 29, 2012 in U.S. Appl. No. 12/486,964, 19 pages.

* cited by examiner

AUGMENTING A FIELD OF VIEW IN CONNECTION WITH VISION-TRACKING

CROSS-REFERENCE TO RELATED APPLICATIONS

This application is related to U.S. application Ser. No. 12/486,964, filed on Jun. 18, 2009, entitled "AUGMENTING A FIELD OF VIEW." The entirety of this application is incorporated herein by reference.

BACKGROUND

Since commercial access was first granted to Global Positioning System (GPS) and other Global Navigation Satellite Systems (GNSS), as well as various other Location-Based Services (LBS), numerous applications have been built around understanding a user's location, and leveraging that location knowledge, often in connection with a stated destination or near-by points of potential interest. For example, GPS navigation systems were first used in connection with 2-D orthographic projection maps to aid users in getting from one point to another. Eventually, however, GPS (or other LBS systems) expanded to aid in discovering and delivering general information about a user's current location, and could potentially include local business listings, advertisements and so forth.

Hence, given a user's location, conventional devices can provide directions to specific locations and, in some cases, allow users to discover services or content relevant to the current location. Such services can even be helpful at a street-level scale. However, current systems and methods for understanding the location of a user such as GPS do not provide the granularity to understand a user's real context in many ways.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can employ vision-tracking techniques to enhance or enrich an experience associated with a field of view of a local environment. In accordance therewith and to other related ends, the architecture can identify or construct gaze attributes by monitoring features of a user's eye or eyes. Based upon these gaze attributes, and further in connection with an indication of location and a perspective (e.g., position, direction, angle, tilt, pitch of a head or face) of the user, the architecture can establish an actual, current field of view of the user in the local environment. Also based upon these data, this field of view can be mapped to an analogous modeled view in connection with a geospatial model of the environment.

Accordingly, in addition to understanding a user's location, which is employed by many conventional systems, the architecture can also understand where and at what a user is currently looking, and can leverage such information to provide previously unattainable levels of personal context and/or more personal or contextual relationships with the environment. For example, based upon the modeled view, the architecture can select additional content associated with one or more modeled entities included in the modeled view. In addition, all physical entities included in the current view need not have a corresponding entity in the geospatial model. Rather, some entities (e.g., object entities) can correspond to modeled entities included in an image-based data store. However, regardless of whether entities in the view are matched to modeled entities in the geospatial model or to modeled entities included the image-based data store, additional content associated with those modeled entities can be presented. The additional content can relate, e.g., to services or information associated with one or more modeled entities.

Moreover, based upon the above-mentioned information that is available, the architecture can further identify an object of focus of the user. In other words, the exact object or feature thereof that a user is currently looking at can be determined, matched to a corresponding modeled entity from one or more databases, and additional content relating to that physical or modeled entity can be surfaced or presented in a manner perceptible to the user without the need for the user to change his or her perspective (e.g., by looking down or sideways to see the additional content). Additionally or alternatively, the architecture can expose features of physical entities or modeled entities in the presentation that are occluded or non-existent in the view. It should be appreciated that the additional content is not limited only to visual content, but can be audio content as well.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
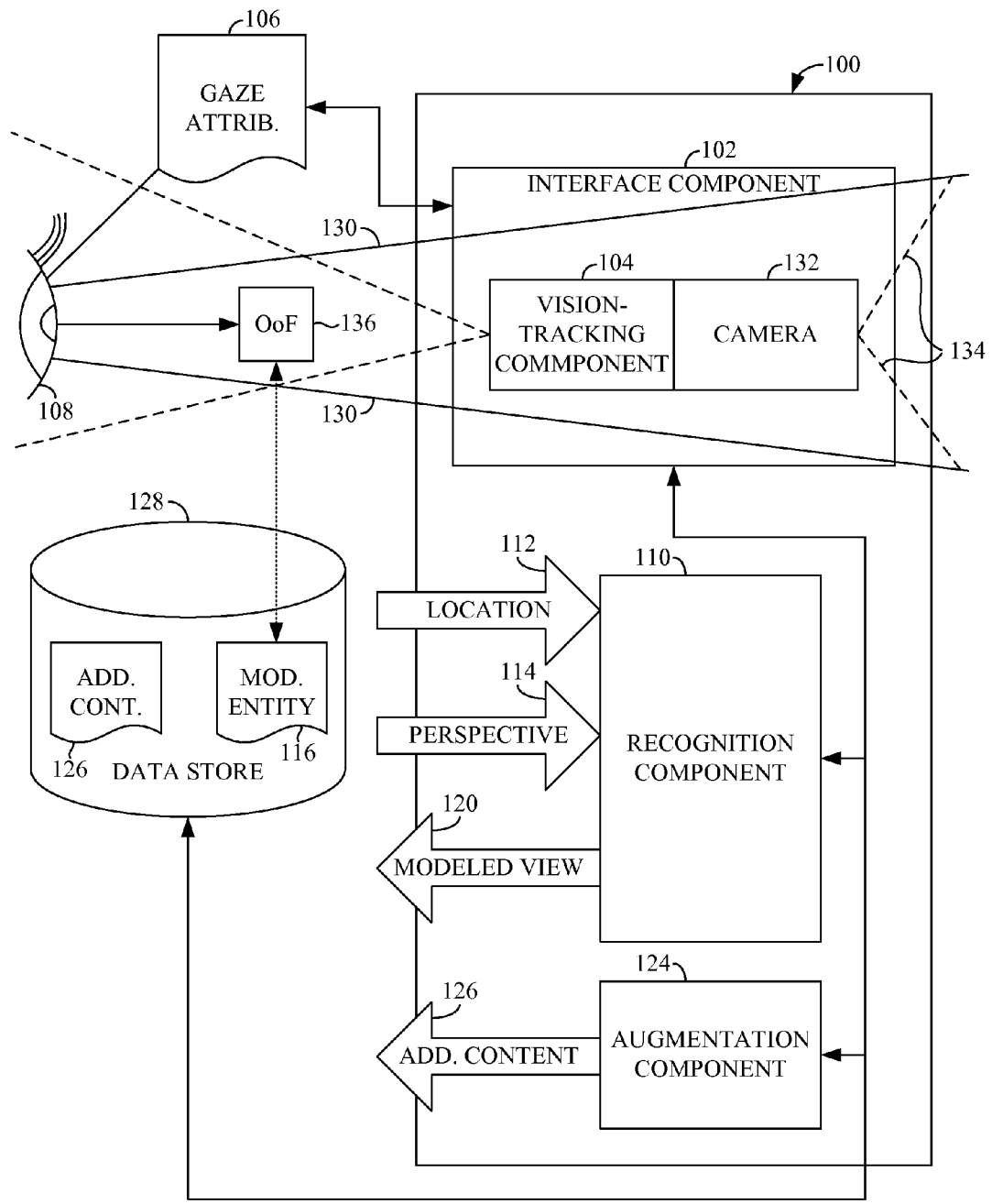
FIG. 1 illustrates a block diagram of a computer-implemented system that can utilize vision-tracking to enhance an experience associated with a field of view of a local environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, system 100 that can utilize vision-tracking techniques to enhance an experience associated with a field of view of a local environment is depicted. In general, system 100 can include interface component 102, which can be operatively coupled to or include vision-tracking component 104. Vision-tracking component 104 can monitor physical characteristics as well as other features associated with an eye or eyes 108 associated with a user. Based upon these monitored features, a set of gaze attributes 106 can be constructed. By way of illustration, gaze attributes 106 can include an angle of rotation or a direction of eye 108 (e.g., with respect to the head), a diameter of the pupil of eye 106, a focus distance, a current volume or field of view (e.g., view 130) and so forth. In one or more aspects of the claimed subject matter, vision-tracking component 104 can tailor gaze attributes to a particular user's eye or eyes 108. For example, machine learning can be employed to adjust or adapt to personal characteristics such as iris color (e.g., relative to pupil), a shape of eye 108 or associated features, known or determined deficiencies, or the like.

In addition, system 100 can also include recognition component 110 that can, inter alia, obtain gaze attributes 106, indication of location 112, indication of perspective (or direction) 114, and employ these obtained data to determine or identify modeled view 120 of a geospatial model (not shown) of the physical world. The geospatial model is further discussed in connection with FIGS. 3 and 7, but as a brief introduction, the geospatial model is intended to be a spatially accurate model of the environment, and can be included in data store 128. Thus, modeled view 120 can correspond to current field of view 130 of the user, wherein the former can relate to a modeled environment while the latter can relate to the physical environment.

In more detail, indication of location 112 can be a location of a user or a device thereof; and can be based on a two-dimensional (2D) or a three-dimensional (3D) coordinate system, such as latitude and longitude coordinates (2D) as well as a third axis of height or elevation. Likewise, indication of perspective 114 can relate to a 3D orientation for the user or an associated device. Typically, both indications 112, 114 can be obtained from sensors included in or operatively coupled to either interface component 102 or recognition component 110, which is further described in connection with FIG. 4. Likewise, both indications 112, 114 will typically relate to or reference the user's face or head, or device associated with the user. Therefore, appreciably, all or portions of interface component (or other components described herein) 102 can be included in or operatively coupled to a head set or wearable device or unit.

In accordance with the above, recognition component 110 can map indication of location 112 (e.g., in the physical world) to a corresponding point or location in the geospatial model. Next, indication of perspective 114 can also be translated to indicate a base perspective or facing direction, which can identify which entities 116 of the geospatial model have physical counterparts in the direction the user is facing. Adding to these data gaze attributes 106, and the recognition component 110 can thus determine a real, physical, current field of view 130 of the user. By mapping field of view 130 to modeled view 120, recognition component 110 can readily identify modeled entities 116 with corresponding physical entities that are presently in a user's field of view. Appreciably, modeled view 120 can be updated in real time as any or all of the user's location 112, perspective 114, or gaze attributes 106 changes.

Furthermore, system 100 can also include augmentation component 124 that can select additional content 126 that can be associated with modeled entity 116 included in modeled view 120. Appreciably, since modeled entity 116 will typically have a physical counterpart that is included in the user's current field of view 130, additional content 126 can be acutely relevant to the current context of the user. Moreover, interface component 102 can present additional content 126 in a manner that is perceptible by the user, which is further discussed in connection with FIG. 2.

Figure 2:
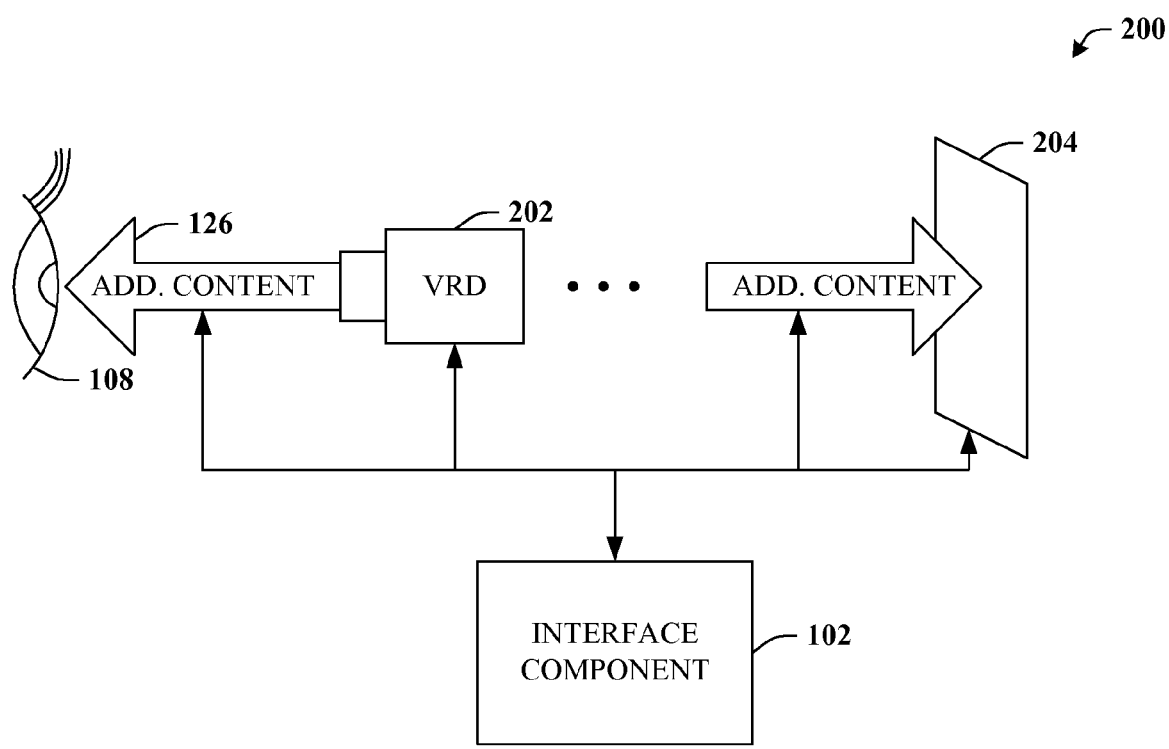
FIG. 2 is a block diagram of a system that can present additional content in a manner that is perceptible to the user.

While still referring to FIG. 1, but turning now also to FIG. 2, system 200 that can present additional content in a manner that is perceptible to the user is provided. Elements depicted in FIG. 2 largely relate to additional content 126 that is visually presented, however, it should be appreciated that additional content 126 can be or include audio content as well, presented by way of speakers (not shown). Audio content is further discussed in connection with FIGS. 6, 7, and 8, infra.

System 200 can include interface component 102 that can monitor gaze attributes 106 and present additional content 126 as substantially described supra. In one or more aspects of the claimed subject matter, interface component 102 can further include or provide at least one of a virtual retinal display (VRD) 202 or a head up display (HUD) 204. Appreciably, other types of displays can be included or provided as well, which is further detailed infra. VRD 202 can draw a raster display directly onto the retina of eye 108. Accordingly, the user can perceive what appears to be a conventional display (or other features) floating in space in front of them, wherein additional content 126 can be surfaced or exposed, potentially leveraging the location, size, shape or other features of physical entities to which the additional content 126 is related. Likewise, HUD 204 can be substantially any physical, transparent display that can present visual aspects of additional content 126.

Continuing the discussion of FIG. 1 and specifically of augmentation component 124, selected additional content 126 can be related to modeled entities 116 that are included in modeled view 120, as discussed previously. These modeled entities 116 can, of course, exist in the geospatial model, as mentioned, but can also exist in other models of data stores. For example, it is conceivable that every physical entity, object, or feature included in the user's current field of view 130 will not always be represented by or have a virtual counterpart included in the geospatial model. In particular, the geospatial model might focus on environment entities (e.g., buildings, roads . . . ) rather than object entities (e.g., books, advertisements, personal articles . . . ), which are discussed in more detail infra in connection with FIG. 7.

By their very impermanent or movable natures, object entities are sometimes not entirely suitable for inclusion in geospatial models. Thus, modeled entities 116 can also reside in other locations, such as an image-based data store (not shown), which is also further discussed in connection with FIG. 7. In accordance therewith, in one or more aspects of the claimed subject matter, interface component 102 can include or be operatively coupled to camera 132. Camera 132 can be substantially any imaging device, either static images or video, and can be configured such that camera view 134 substantially encompasses current field of view 130 of the user and/or eye(s) 108. Hence, images obtained by camera 132 can include physical entities included in field of view 130, and these imaged entities can be matched against the image-based data store to identify corresponding modeled entities 116, potentially employing object recognition techniques or other identification techniques such as bar codes, UPCs, logos, trademarks, or the like. Moreover, images from camera 132 can be employed for feedback or updates, e.g., to the geospatial model, the image-based data store, or other databases or stores.

In one or more aspects of the claimed subject matter, recognition component 110 can further determine an object of focus 136. Naturally, object of focus 136 will be included in field of view 130. Thus, for environment entities, recognition component 110 can determine object of focus 136 based upon gaze attributes 106 and indications of location 112 and perspective 114. In the case of an object entity, recognition component can employ gaze attributes 106, location 112 and perspective 114; and further match this information to an image captured by camera 132. In either case, object of focus 136 can be expressly mapped to an associated modeled entity 116, either from the geospatial model, the image-based data store, or another source. Moreover, augmentation component 124 can select additional content 126 that is specific to object of focus 136 or the associated modeled entity 116. Additional features, aspects, elements, or implementations are further detailed infra.

Figure 3:
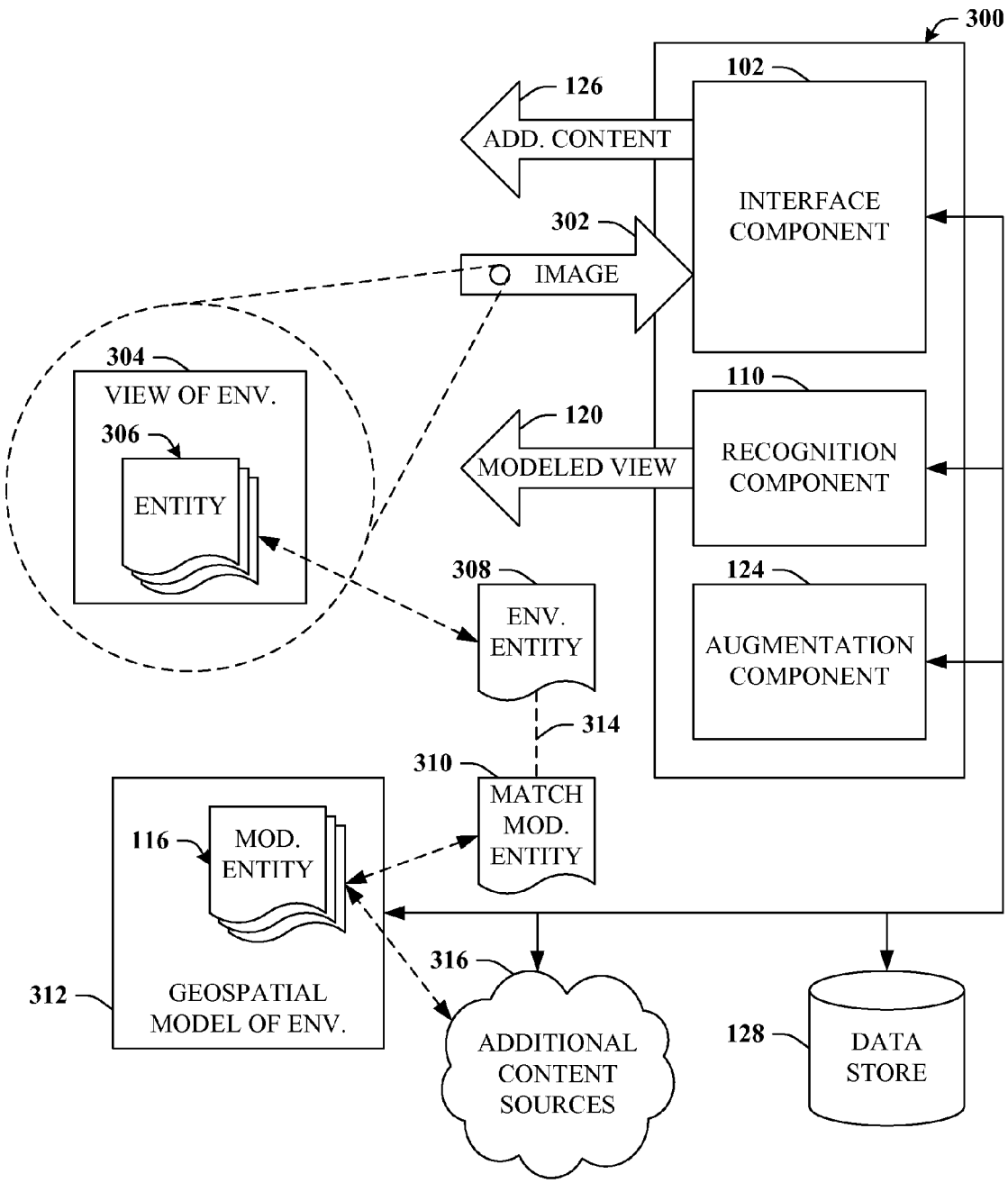
FIG. 3 illustrates a block diagram of a computer-implemented system that can enhance an experience associated with a field of view of a local environment.

Turning now to FIG. 3, computer-implemented system 300 that can enhance an experience associated with a field of view of a local environment is depicted. Generally, system 300 can include interface component 102 that can receive image 302. Image 302 can be substantially any type of visual-based content, including, e.g., a still image or video. Interface component 102 can include or be operatively coupled to a physical display suitable for presenting image 302 as well as other content or media. Moreover, it should be appreciated that system 300 can be implemented entirely or in part in a device that is capable of capturing or creating image 302 and delivering image 302 to interface component 102, such as camera 132 or another type of recorder; or devices that include camera 132 such as, e.g., a cellular phone, a smart phone, a Personal Digital Assistant (PDA), a laptop, a media device, or similar devices as well as a headset, specially equipped glasses, or other wearable devices, and so on. In general, the term "local environment" is intended to refer to the surrounding of the imaging device 132 that captures image 302, or an environment that is local to an associated user. Oftentimes, this device will also include a display for visually presenting view 304 depicted by image 302.

As is illustrated by the exploded portions, image 302 can be encoded data or a stream that, when rendered or decoded, depicts a view of a local environment (e.g., view 304). In particular, view 304 can be a specific portion of the local environment that includes set 306 of entities. An entity included in set 306 can relate to an object, feature, or element included in or depicted by view 304, which is further detailed in connection with FIGS. 5 and 6. The entity can be classified as one or both of an environment entity or an object entity, which is discussed further with reference to FIG. 7. As a brief introduction, however, environment entities typically relate to inert or structural features (e.g., a building or a road) of the environment, whereas object entities usually refer to movable, variable, or impermanent features or articles (e.g., a book or an advertisement) of the environment. Appreciably, view 304 can be substantially similar to current view 130 and/or camera view 134 detailed supra. However, view 304 (as with camera view 134) is that of an imaging device whereas view 130 is intended to relate to the actual field of view of a user or the user's eye(s). Otherwise, many features or aspects described in connection with each can be appropriately overlap.

In addition, system 300 can also include recognition component 110 that can match an entity from set 306 to a modeled entity that is a member of set 116 of modeled entities, wherein set 116 of modeled entities can be included in geospatial model 312 of the environment. In essence, geospatial model 312 can include a 3-dimensional, spatially accurate representation of not only the local environment (e.g., a room or a city block), but of other environments (e.g., other city blocks or the entire city) or a universe of locales or environments (e.g., a model of the entire Earth or beyond). Moreover, geospatial model 312 can include historic views of the environment, future views of the environment, as well as current or present-day views. In addition, geospatial model 312 can include markers or tags to past, present, or future events or objects associated with a location. Appreciably, although image 302 will often include many identifiable entities, those selected for correlations with geospatial model 312 will typically be classified as environment entities. Thus, recognition component 110 can identify and match environment entity 308 (e.g., an environment entity from set 306 included in view 304 captured by image 302) to corresponding modeled entity 310, which can be a member of (or portion of) set 116 included in geospatial model 312.

Based upon correlations 314 between environment entity 308 and modeled entity 310, recognition component 110 can scope and/or define corresponding modeled view 120. For example, based upon view 304 as depicted by image 302, recognition component 110 can identify a matching or analogous view of geospatial model 312. Put another way, whereas image 302 can capture a particular, bounded perspective of the real, physical world, modeled view 120 that is scoped by recognition component 110 can represent the same perspective and scope as that depicted in image 302, yet applied to a modeled landscape rather than to the physical world. One benefit of mapping a real view (e.g., view 304) to a modeled view (e.g., modeled view 120) is that experiences associated with a presentation of the real view can be readily enhanced. As one example, the real view is essentially limited to that which is expressly depicted by image 302, whereas geospatial model 312 can be examined to identify elements or features that are not included in the real view, such as elements or features occluded from view, but within the scope of the view, or elements or features that are just outside of the real view. Moreover, various information or services (e.g., additional content 126) associated with one or more modeled entity 116 can be exposed, e.g., in connection with a presentation of image 302 that includes related entities 306.

Figure 4:
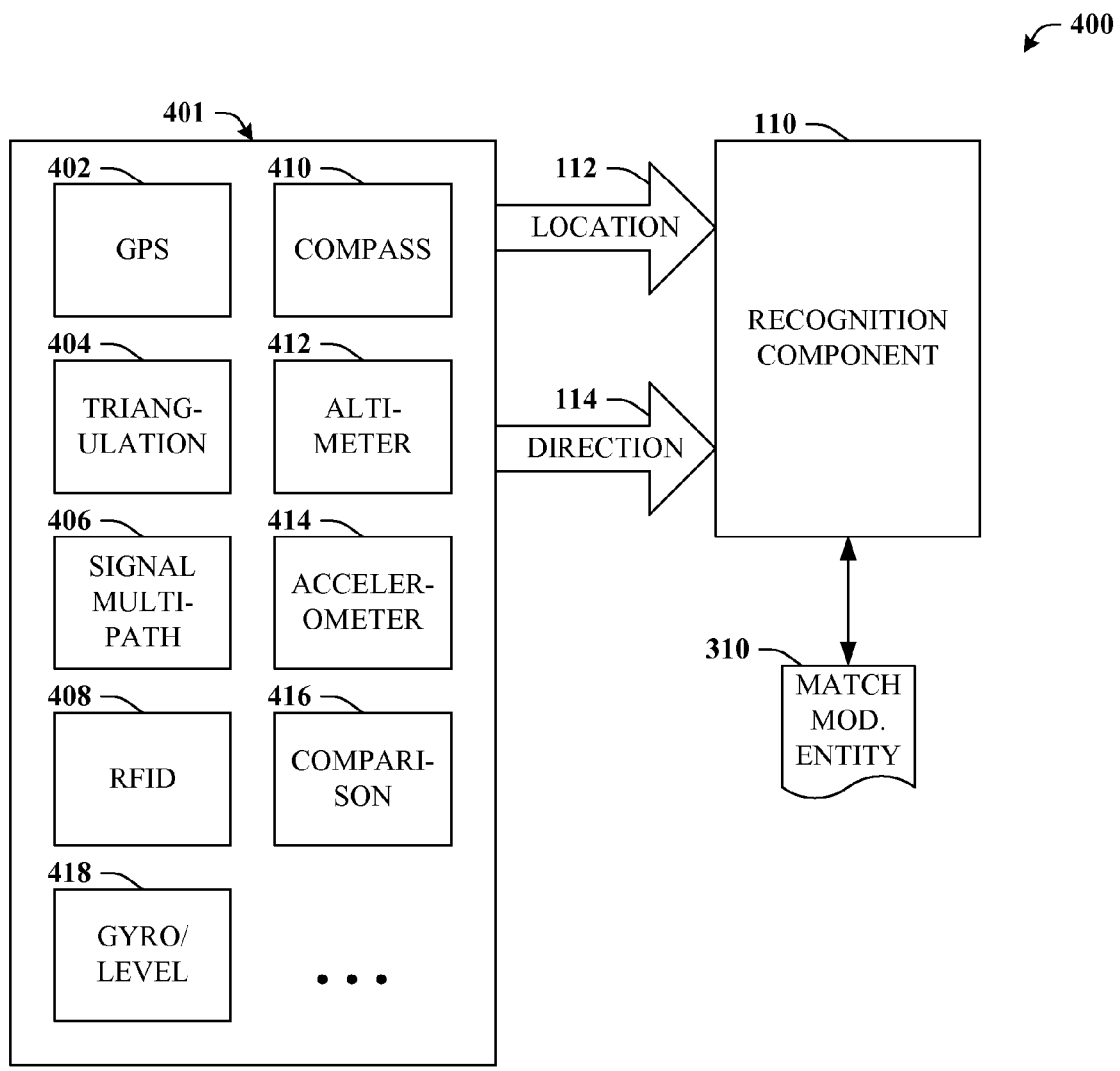
FIG. 4 is a block diagram of a system that can receive orientation indicia in order to scope the modeled view.

While still referring to FIG. 3, but turning simultaneously to FIG. 4, system 400 that can receive orientation indicia in order to scope the modeled view is illustrated. In particular, system 100, system 300, or components thereof can be operatively coupled to set 401 of sensors or other indicia. As detailed supra, all or portions of systems 100 or 300 can be embodied in a device capable of receiving and/or capturing image 302. Likewise, such a device can also further include all or portions of the sensors or indicia included in set 401. Largely, set 401 pertains to devices or sensors that can accurately identify or determine one or more aspects of location, direction, and/or orientation; and, as such, will be situated in whole or in part in the local environment.

To provide a few concrete examples, set 401 can include Global Positioning System (GPS) unit 402, which can provide precise indications of location, time, and speed. Of course, other techniques for determining location can also be employed such as signal triangulation (or trilateration) 404. For example, signal strength measures at various stationary transceivers can be measured by well-known means in order to pinpoint the location of the transmitting device. One such example is Wireless Application Protocol (WAP), wherein radiolocation, triangulation, and/or trilateration can be employed in connection with radio waves or other electromagnetic radiation.

Set 401 can also include devices or techniques associated with signal multipath 406, wherein the same signal is received multiple times, generally due to reflection or interference between the transmitter and receiver. Furthermore, well-known techniques associated with Radio Frequency ID (RFID) 408 can also be employed to determine features associated with location or orientation. In addition, devices or indicia related to a directional compass 410, including but not limited to a magnetic compass, a gyrocompass, an astrocompass, or an electronic compass. Likewise, altitude can be determined based upon substantially any type of altimeter 412; whereas certain motions, gestures, or accelerations can be determined by accelerometer 414; and an angle (e.g., angle of view) relative to the ground can be determined by gyroscope or level 418. Of course, numerous other devices or techniques can be employed in connection with the claimed subject matter, such as clocks, range finders, direction finders and so forth. Moreover, the indicia provided can also include a comparison of view 304 with modeled view 120, e.g., employing recursive comparisons to increase precision with respect to position and/or orientation.

In an aspect of the claimed subject matter, recognition component 110 can employ indication of location 112 and indication of perspective/direction 114 in order to match environment entity 308 with matching modeled entity 310. Indication of location 112 or indication of direction 114 can be recorded by one or more members of set 401 at the time when image 302 is created. Thus, such location and direction data (e.g., indications 112 and 114) can be embedded and/or included in image 302 as it is captured. Upon receipt of indication of location 112, recognition component 110 can identify a geographic origin (e.g., the local environment) of the real view 304, which can be precisely mapped to the geospatial model 312, and can establish the appropriate locale and the origin for modeled view 120. However, just as an individual standing at a particular location cannot simultaneously perceive the local environment from every conceivable angle, but rather focuses in a single direction at a given time; indication of direction 114 can be employed to determine or scope the direction of focus of view 304 and/or image 302. Once location and direction have been ascertained, the process of identifying a matching modeled entity 310 can be greatly simplified, as can properly scoping modeled view 120.

Continuing the discussion of FIG. 3, it should be understood that system 300 can also include or be operatively connected to data store 128. Data store 128 is intended to be a repository of all or portions of data, data sets, or information described herein or otherwise suitable for use with the claimed subject matter, and can potentially include other information stores or sources such as all or portions of additional content sources 316, geospatial model 312, or an image-based data store 704 discussed in connection with FIG. 7. Data store 128 can be centralized, either remotely or locally cached, or distributed, potentially across multiple devices and/or schemas. Furthermore, data store 128 can be embodied as substantially any type of memory, including but not limited to volatile or non-volatile, sequential access, structured access, or random access and so on. It should be understood that all or portions of data store 128 can be included in systems 100, 300, or can reside in part or entirely remotely from systems 100, 300.

In addition, system 300 can also include augmentation component 124 that can select additional content 126 that is associated with one or more modeled entities included in set 116, potentially from a variety of additional content sources 316 including but not limited to proprietary data stores, web-accessible content, cloud-accessible content, client-shared data stores or the like. Hence, additional content sources 316 can include Geographic Information Systems (GIS), public records, media companies, government provided information, non-government organizations, and can even include or access various personal or private information such as social networks, personal calendars or schedules, preferences, contacts, behaviors or the like, which is further discussed in connection with profiles detailed infra.

Appreciably, set 116 can include substantially any modeled entity included in geospatial model 312 (or image-based data store 704 discussed infra), but can be limited in some cases to only those modeled entities that exist in modeled view 120 or a near proximity to or periphery of modeled view 120. In either case, it should be understood that modeled view 120 can include modeled entities 116 that correspond to representations of real entities 306, such as those that are either visible or occluded in image 302. Understandably, augmentation component 124 can operate as a first level of scalability by surfacing more or less content selectively based upon, e.g., the quantity of additional content 126 relevant to current view 304. A number of examples of the above-mentioned and other features are illustrated with reference to FIGS. 5 and 6, both of which are discussed while still referencing FIG. 3.

Figure 5:
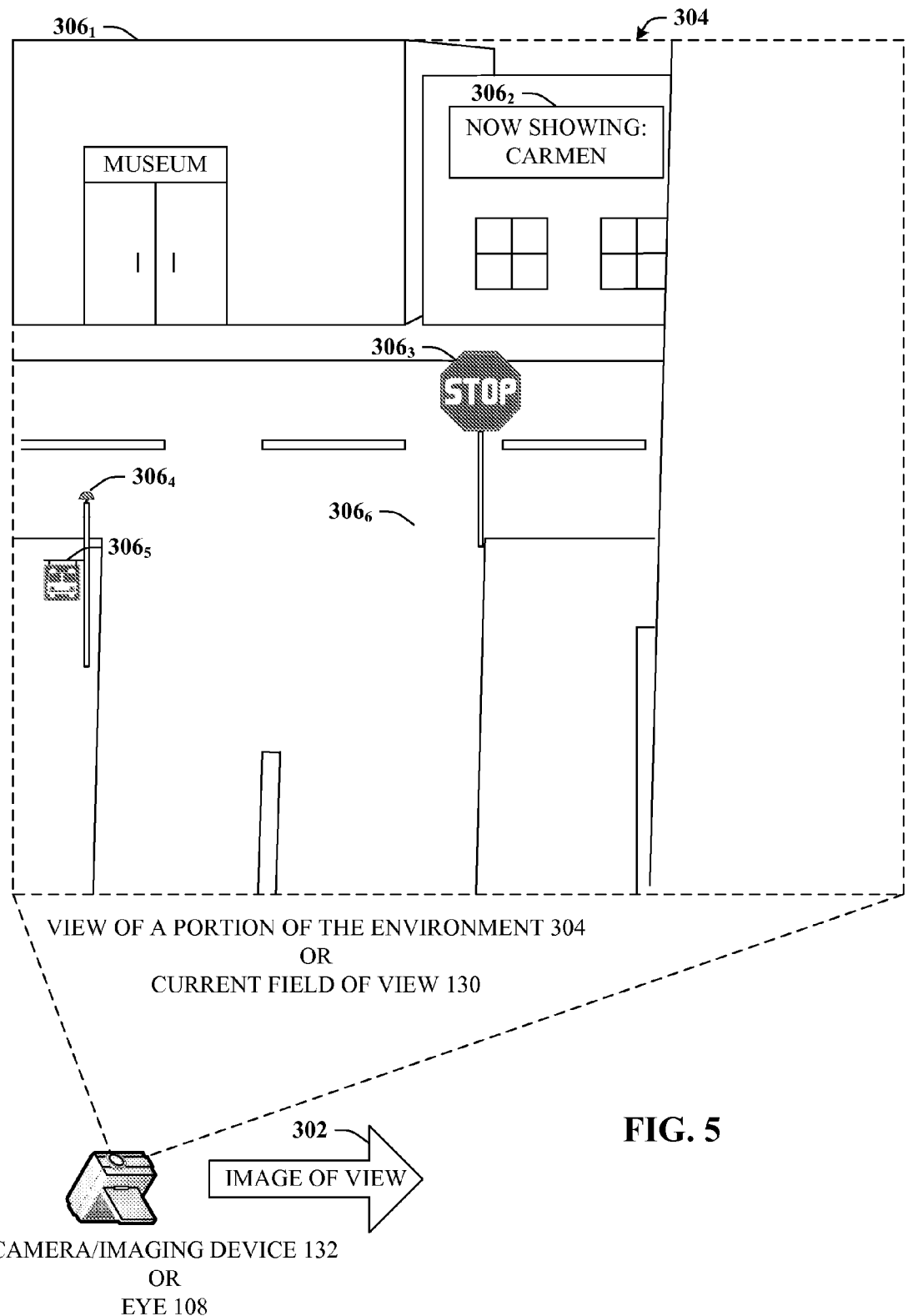
FIG. 5 provides a block diagram of a graphic illustration of an example view of a local environment.

Turning now to FIG. 5, a graphic illustration of an example view of a local environment is provided. Thus, view 304 comprises a specific portion of a local environment, in this case, the scene captured by camera 132, which can capture view 304 and can output the associated image 302. As with substantially any view, example view 304 depicted here includes a number of entities 306, which can be classified at least for purposes of ease of explanation as one or both of environment entities or object entities. In particular, a number of entities, labeled as $306_1$-$306_6$ are referenced in example view 304, but it should be understood that various other entities do or could exist. Entity $306_1$ references the building that houses a museum, while entity $306_2$ references a marquee of the adjacent building, in this case an opera house that is advertising a production of Carmen. Entity $306_3$ refers to a stop sign, entity $306_4$ refers to a street lamp, entity $306_5$ refers to a bus stop sign, and entity $306_6$ refers to a street or an intersection of two streets. Appreciably, interface component 102 (and other components of system 100) can be included in camera 132 (or any other suitable device) and can receive image 302 depicting view 304, which is illustrated in connection with FIG. 6.

Figure 6:
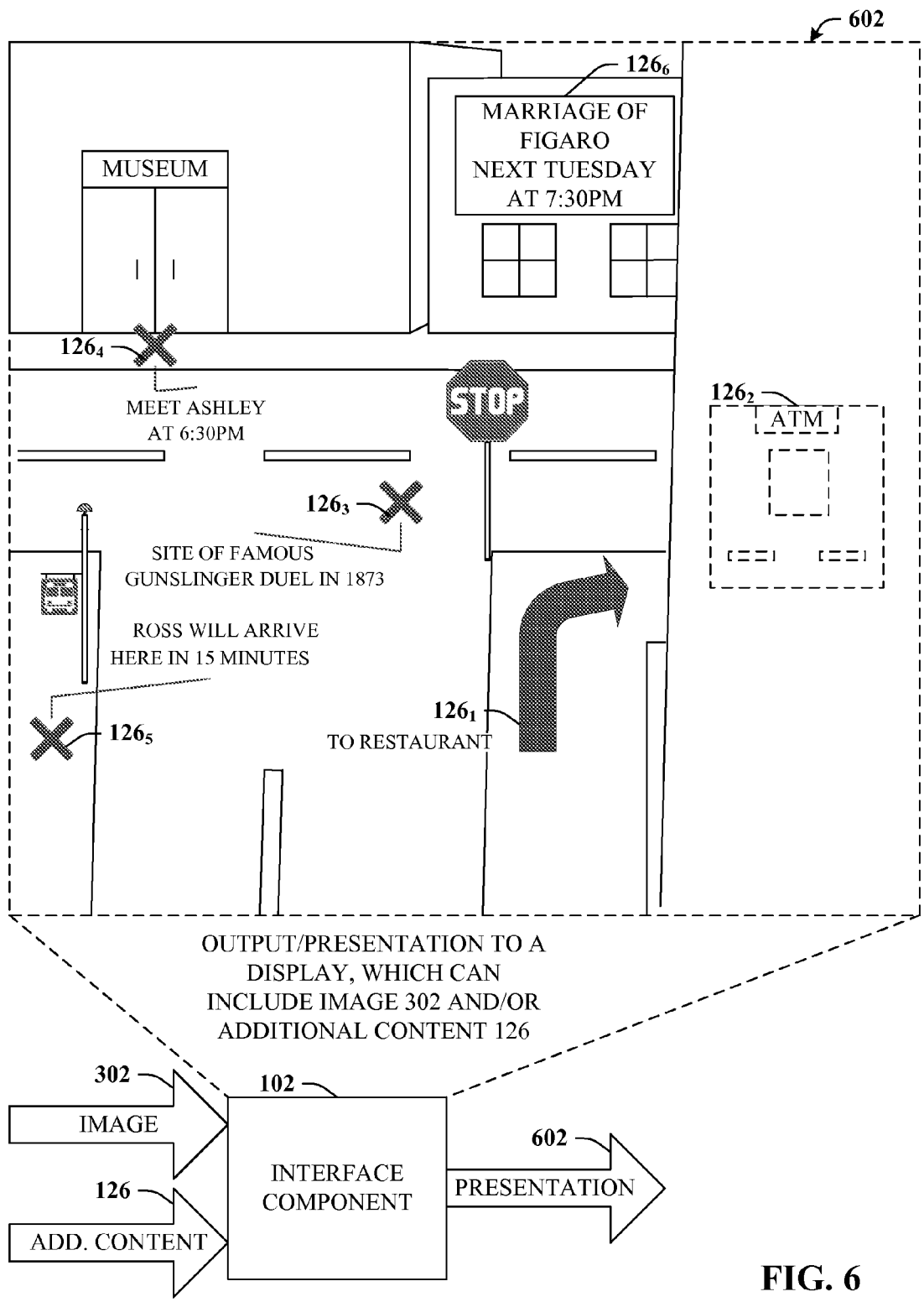
FIG. 6 illustrates a block diagram of a graphic illustration of example presentation 602 that depicts features associated with an augmented presentation of image 132.

FIG. 6 provides a graphic illustration of example presentation 602 that depicts features associated with an augmented presentation of image 302. As described supra, interface component 102 can receive image 302 and additional content 126; and can output additional content 126 in the form of presentation 602, typically along with image 302. Presentation 602 can therefore provide the same visual perspective and scope as that of view 304, yet augmented with additional content 126. In other cases, presentation 602 can be of differing dimensions; for example, due to a size or resolution of the display to which presentation 602 is output. Thus, presentation 602 can be cropped or expanded, the latter potentially based upon other views 304 or other images 302 or by casting modeled entities 116 from geospatial model 312 onto presentation 602.

Accordingly, in an aspect of the claimed subject matter, interface component 102 can provide presentation 602 by presenting view 304 (e.g., example view illustrated in FIG. 5) and overlaying view 304 with additional content 126. As one example, consider a pedestrian who captures an image of example view 304 from FIG. 5, with the resultant image 302 output to a display screen as presentation 602. Further suppose the pedestrian is searching for an Italian cuisine restaurant. In accordance therewith, interface component 102 can overlay additional content $126_1$, which is an indication of the route to the nearest Italian restaurant. Understanding that the pedestrian is searching for an Italian restaurant can be expressly input, but can also be determined or inferred based upon profile information (e.g., the pedestrian enjoys Italian food and/or typically eats lunch at this time of day) and/or based upon an advertising model, which is further detailed with reference to FIG. 8.

Additionally or alternatively, interface component can expose a feature of a modeled entity included in set 116 of modeled entities, wherein the feature is occluded or non-existent in the view. An example can be found with reference to additional content $126_2$. Additional content $126_2$ depicts an Automated Teller Machine (ATM) displayed as an outline to indicate the location of the ATM that, while not in the line of sight, is just around the next corner, mounted on the nearby street-side building.

It should be appreciated that additional content 126 need not be only visual-based content, but can be in other forms as well, such as audio-based content. For example, additional content 126 can be an audio stream associated with one or more modeled entities 116 included in geospatial model 312 or elsewhere. In an aspect, interface component 102 can present (e.g., as part of presentation 602) the audio stream when view 304 is substantially focused on an entity 306 or a location that corresponds to a modeled entity 116. For example, although not depicted here, suppose the view 304 is substantially centered on an informative plaque at the foot of a bronze statue or other monument. In that case, or in other situations, it can be determined or inferred that an interest relating to the monument exists. Thus, augmentation component 124 can select additional content 126 such as an audio voice-over related to the monument that recites the text of the plaque (e.g., employing well-known means of text-to-speech translation techniques) or can provide other related information obtained elsewhere, for instance from additional content sources 316. Such features can be useful as a matter of convenience, to aid those visually impaired or to provide translation to a native or known language.

As another example, consider entity $306_6$ of FIG. 5, which marks a street or intersection in the present-day view, but may have once been the site of a past historical event, as is exemplified by additional content $126_3$. As view 304 is substantially centered here, audio information can be presented relating to the famous duel of 1873, with, for example, the "X" or other location indicia highlighted or flashing to indicate the particular location associated with the audio information being presented. Rather than being based upon an area of focus, additional content $126_3$ associated with the duel can be provided upon selection, such as clicking a cursor on the "X" or based upon tactile selection in connection with a touch-based display.

Likewise, along with (or in lieu of) the audio presentation, additional content $126_3$ can overlay, or otherwise be displayed at that location, associated video content, such as a video documentary or a dramatization of the duel. Appreciably, the A/V additional content $126_3$ can be panoramic or larger than the field of view of the camera such that moving the camera from side-to-side (e.g., changing the view 304 of the environment) reveals different views or portions of the video and/or changes the volume, frequency, or pitch of the associated sounds. In a similar manner, additional content 126 associated with the Italian restaurant, such as menus, specials, coupons, reservations, wait times, or even real-time or modeled video of the interior or atmosphere can be provide, e.g., by selecting the addition content direction arrow labeled $126_1$.

In addition, based upon a profile and/or an ad model, various other additional content 126 can be surfaced, examples of which are provided in connection with reference numerals $126_4$-$126_6$. For example, based upon a calendar, agenda, or schedule, additional content $126_4$ can be presented indicating the time and location of a scheduled meeting, say at a conference room or, as depicted here, at the local museum. Additional content $126_5$, potentially based upon a contact list, social network, or another trust-based network where third party information is voluntarily provided to trusted members, can include location-based information, which can provide an indication that a friend will arrive at the bus stop in about 15 minutes.

For instance, a query of the associated bus schedule can yield a potential arrival time/place once it is known that Ross boarded the bus—information that Ross might be willing to share with trusted parties, such as friends, family or the like. The final example is in connection with additional content $126_6$. It should be underscored that in the actual view 304, the marquee advertised a production of "Carmen." However, the associated operator of the device that outputs presentation 602 might have recently attended a production of "Carmen;" might be too busy at today to attend what is now showing; might be free at a later time, say next Tuesday at 7:30 pm; or might simply dislike "Carmen" or prefer operas by Mozart such as "Marriage of Figaro." Hence, what is ultimately presented as additional content $126_6$ can replace features of view 304 and can be obtained, e.g., by a query of the opera house's website, and selected based upon the operator's profile (e.g., schedule of availability, recent transactions, preferences . . . ) and/or an ad model, all of which is further discussed in connection with FIG. 8. Appreciably, selecting additional content $126_6$ can reference convenient ticketing purchase options as well.

Figure 7:
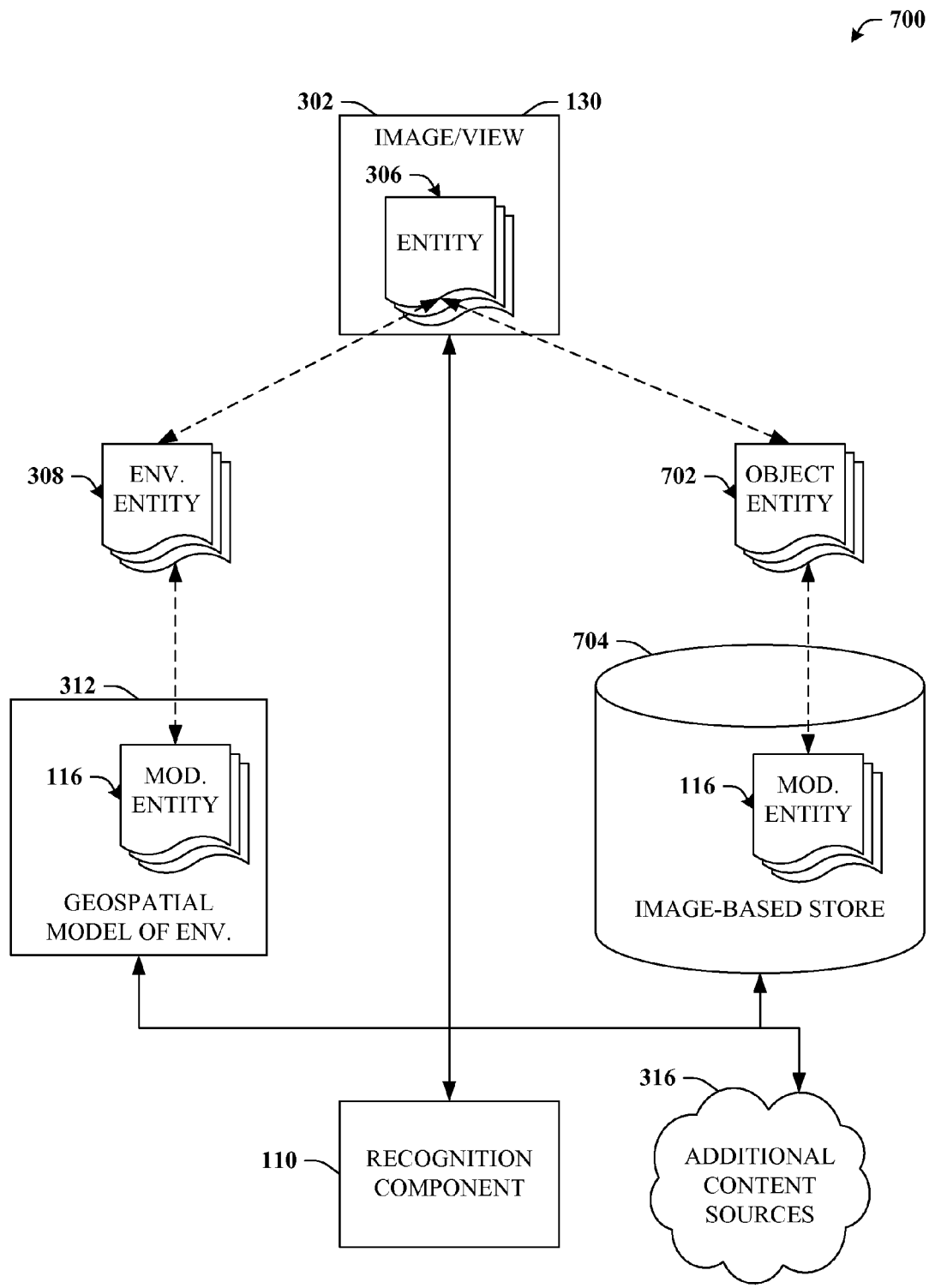
FIG. 7 depicts a block diagram of a computer-implemented system that illustrates example entity classification and/or examination.

Turning now to FIG. 7, system 700 illustrates example entity classification and/or examination. System 700 can include recognition component 110 that can match entity 306 included in image 302 (or current field of view 130) with a corresponding modeled entity 116 as described supra. As was also previously introduced, entity 306 can be categorized as one or both environment entity 308 or object entity 702. Accordingly, set 306 of entities included in view 304 can include set 308 of environment entities and/or set 702 of object entities. While much of the prior discussion has been directed to environment entities 308, it should be underscored that recognition component 110 can identify object entities 702 included in image 302 as well. Moreover, object entities 702 can be the subject of many of the features described herein For example, object entity 702, in image format, can form the basis of a query to image-based data store 704. The object entity 702 can then be correlated with object records and/or modeled entity 116 included in image-based data store 704. Based upon the match, augmentation component 124 can select additional content 126 included in or referenced by image-based data store 704 (e.g., tags that reference additional content sources 316). For instance, consider an image of a bottle of wine that a user snaps because she finds that wine particularly appetizing. Said image can be employed to match the pictured entities 306 (e.g., the image of the wine label, the shape or color of the bottle . . . ) with a wine product included in the image-based data store 704, which can then form the basis of selecting additional content 126 from among information included in image-based data store 704 and/or additional content sources 316.

It should be appreciated that numerous other examples are contemplated apart from the wine bottle example introduced above. For instance, object entity 702 can be a representation of a logo, a brand, or a trademark. Additionally or alternatively, object entity 702 can be a representation of a sign, a poster, a menu, a billboard, or an advertisement. Other examples of object entity 702 can include a representation of a graphical or visual work with artistic, entertainment, or commercial value; a book, a compact disc (CD), a digital versatile disc (DVD), a product, or product packaging; or a residence, a public site, a commercial site, or a landmark.

Thus, a user can potentially image items in a pantry or a refrigerator or freezer, and presentation 602 of that image can include additional content 126 such as dates of purchase and/or estimated remaining shelf life (e.g., based upon product identification in connection with purchase/transaction histories included in a profile and/or additional content sources relating to shelf life for the identified product). Object entities 702 can also provide a convenient or useful way of leveraging additional content 126 in audio formats. For example, consider a user who is browsing music in a second-hand CD store. The user can capture image 302 of a particular CD jewel case, and then audio samples of various tracks from the CD album can be provided with presentation 602 as described herein.

Figure 8:
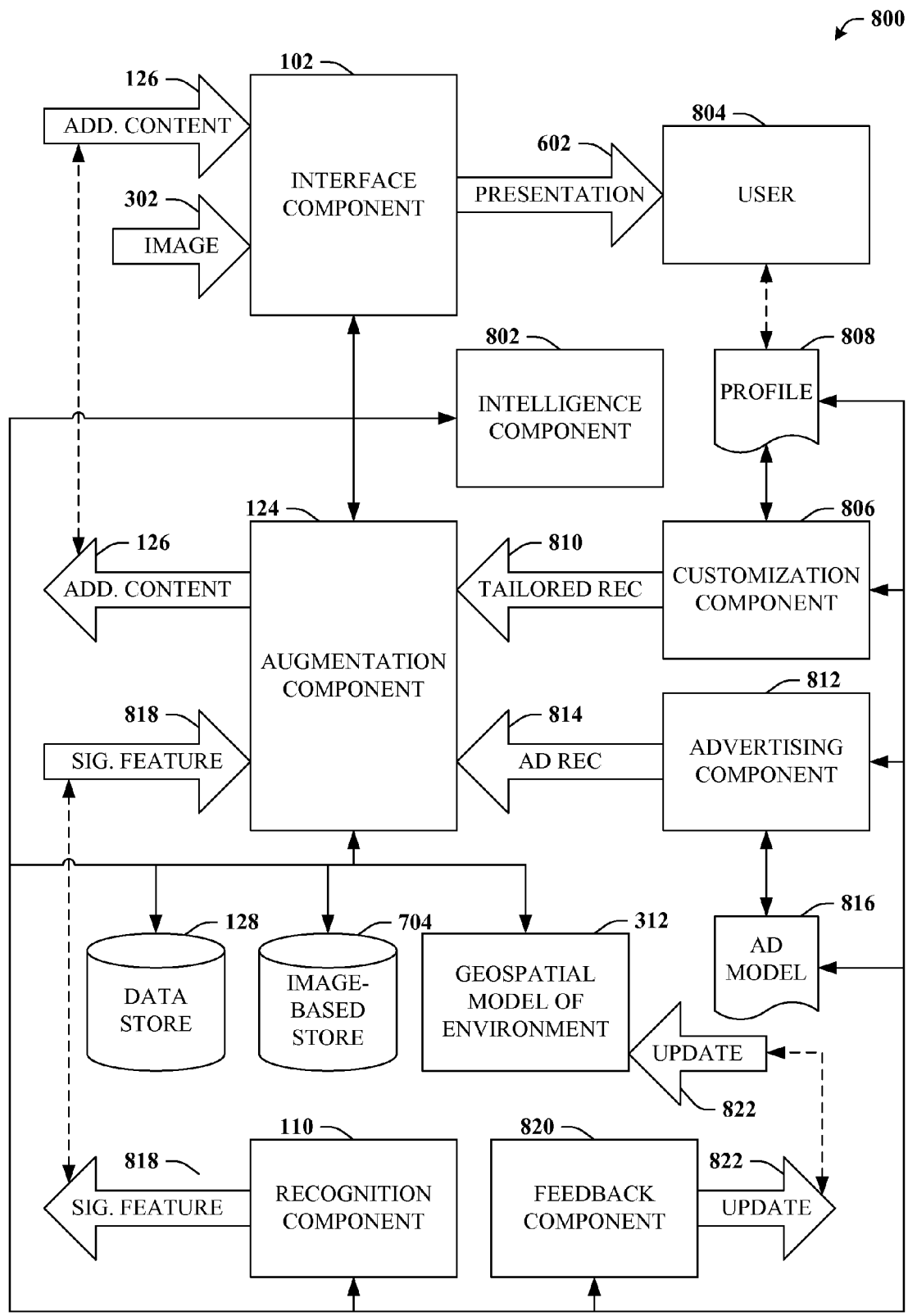
FIG. 8 is a block diagram of a system that can further tailor content based upon profile information and/or advertising models.

With the foregoing in mind, FIG. 8 can now be referenced. FIG. 8 illustrates system 800 that can further tailor content based upon profile information and/or advertising models. Generally, system 800 can include interface component 102, recognition component 110, and augmentation component 124 as substantially described herein. In particular, interface component 102 can receive image 302 and, based upon correlations between pictured entities 306 and modeled entities 116 (e.g., those included in geospatial model 312 and/or image-based store 704), recognition component 110 can established matches and can also scope a modeled view 120, the latter typically aided by location and direction indicia associated with the image 302. Thus, augmentation component 124 can then select additional content 126 that can be displayed to user 804 by interface component 102 as presentation 602, which generally includes all or portions of image 302.

Typically, augmentation component 124 will select additional content 126 that is deemed to be relevant based upon various settings, defaults, or contextual information or inferences thereof. As has been conceptually introduced supra by way of various examples etc., augmentation component 124 can be aided by customization component 806 that can tailor additional content 126 based upon profile 808 that is associated with user 804. Thus, customization component 806 can provide tailored recommendation 810 to augmentation component 124, wherein tailored recommendation 810 can be deemed to be especially relevant in light of profile 808, and thus particularly well-suited to user 804. Thus, augmentation component 124 can have the option of selecting additional content 126 normally as well as choosing from among one or more tailored recommendations 810.

Profile 808 or other data employed by customization component 806 can include can include a variety of information relating to user 804 (or an associated device), such as that which is expressly described herein as well as other information suitable for or within the spirit of the claimed subject matter. For example, profile 808 can include preferences or defaults associated with user 804, a current or recent location of user 804, a current or recent transaction (e.g., a purchase, an encounter, a charitable donation, a rating, review, or other feedback, an input such as image 302 . . . ) of user 804, or a history of locations or transactions. Profile 808 can also include schedule or calendar information associated with user 804 or other time-related aspects, social networks, contact lists, trust relationships associated with user 804, demographic data associated with user 804 such as age, gender, income, race, residence, or the like. In addition, customization component 806 can access data relating to hobbies, interests, viewpoints, or essentially any available information that can be employed to provide tailored recommendation 810.

Several illustrations of employing such profile information, in particular scheduling and social networking information contained therein are illustrated in FIG. 6 with reference to, e.g., elements 126$_4$-126$_6$. However, it should be appreciated that numerous other examples can exist. For example, name labels can be displayed over individuals in view 304 if such information is authorized, such as for those in a trusted network. This can be especially useful when one's social network is particularly large or extended out many degrees, or simply when names are difficult for an operator (e.g., user 804) to remember.

System 800 can also include advertising component 812 that can recommend additional content 126 in the form of ad-based recommendation 814. Advertising component 812 can provide ad-based recommendation 814 based upon advertising model 816. Advertising model 816 can be based upon a pay for attention model in which advertisers can bid to surface associated content and/or to become more visible in presentation 602. Additionally or alternatively, the advertising model 816 can be based upon rankings of the advertisers. It should be appreciated that advertising recommendation 814 can be further filtered or tailored by customization component 810 based upon profile 808.

To illustrate additional capabilities, recognition component 110 can further identify significant feature 818 that can be included in at least one of view 304 of the local environment, the local environment, image 302, modeled view 120, the model of the environment (e.g., set 116 of modeled entities), or additional content 126. Upon identification of signification feature 818, augmentation component 124 can determine or infer a suitable manner to accentuate or obscure significant feature 818, and interface component 102 can update presentation 602 accordingly.

For example, consider a crowded environment such as a subway terminal, a concert, or theme park, in which view 304 includes a large number of persons in the local environment. In such a situation, it can be difficult to spot persons whom user 804 might be interested in identifying. However, recognition component 110 can attach a level of significance to a subset of those in the local environment (e.g., based upon social networks). Augmentation component 124 can then determine a suitable manner to accentuate or obscure those persons (denoted as significant features 818), which can be to insert name labels over some recognized individuals as described supra, or to highlight or outline their physical forms in presentation 602, or to increase the relative size of significant features 818. Therefore, friends or colleagues one might otherwise pass by without noticing in a crowded subway can now be quickly spotted. Likewise, wayward children can be more easily located, e.g., in a crowded theme park, or vice versa aiding children to locate parents. As another example, the parties involved in blind or first dates can be identified instantly potentially avoiding the sometime awkward moments when neither party is entirely sure of the other's identity.

Appreciably, in addition to accentuating, augmentation component 124 can also recommend deemphasizing or obscuring significant features 818. This can be applied to the above examples in that all but the significant features 818 are removed or deemphasized. However, significant features 818 can also be identified by recognition component 110 as elements that should be actively removed from presentation 602. For instance, suppose user 804 is politically or morally opposed to the business practices of a particular advertiser or, say, dislikes litter. In such cases, recognition component 110 can identify instances of litter or references to particular advertisers as significant features 818, and those features 818 can be obscured from presentation 602 such as by omitting them entirely or replacing with additional content 126.

It should be further understood that in some cases significant feature can be slightly beyond the periphery of the field of view. For example important or relevant features that are nearby but not actually within the scope of view 304 can be surfaced or referenced in a suitable manner. Likewise, it should also be understood that significant feature 818 need not necessarily be a visual feature. Rather, significant feature 818 can be, e.g., an audio feature. For instance, consider the case in which user 804 is in a noisy environment in which a colleague is speaking to or calling out to user 804. Recognition component 110 can identify the colleague's speech as significant feature 818, and interface component 102 can accentuate the colleague's speech to make it more apparent to user 804. As another example, consider the case in which user is listening to music, e.g., by way of a portable media device and therefore is not readily aware of sounds occurring in the local environment. Further suppose recognition component 110 detects an ambulance siren in the local environment and identifies the siren as significant feature 818. In this case, interface component 102 can be instructed to mute the music temporarily and/or stream a representation of the siren to suitable output devices such that the user 804 can be aware of the siren.

System 800 can also include feedback component 820 that can propagate update 822 in order to update to geospatial model 312. Update 822 can be based upon the image and, more particularly, based upon a divergence between image 302 and modeled view 120. Typically, updates 822 will relate to changes to the local environment in the time since creation or the last updates of the geospatial model 312, such as a new construction or a renovation to a building. Of course, other examples can exist; however, it is useful to note that geospatial model 312 can be kept substantially accurate and/or current simply by user-based utilization of associated systems rather than by more expensive or inefficient means such as periodic auditing or the like.

In addition, system 800 can also include intelligence component 802 that can provide for or aid in various inferences or determinations. In particular, in accordance with or in addition to what has been described supra with respect to intelligent determination or inferences provided by various components described herein. For example, all or portions of recognition component 110, augmentation component 124, customization component 806, advertising component 812, or feedback component 820 can support machine learning techniques, potentially based upon historic data or past decisions, to refine various inferences. Additionally or alternatively, some or all of the described components can employ Bayesian principles or stochastic techniques to predict preferred or likely outcomes based available data.

It is to be appreciated that intelligence component 802 can be operatively coupled to all or portions of components 110, 124, 806, 812, or 820. Additionally or alternatively, all or portions of intelligence component 802 can be included in one or more components described herein. Moreover, intelligence component 802 will typically have access to all or portions of data sets described herein, such as data store 128, additional content sources 316, geospatial model 312, or image-based data store 704, and can furthermore utilize previously determined or inferred data.

Accordingly, in order to provide for or aid in the numerous inferences described herein, intelligence component 802 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 9:
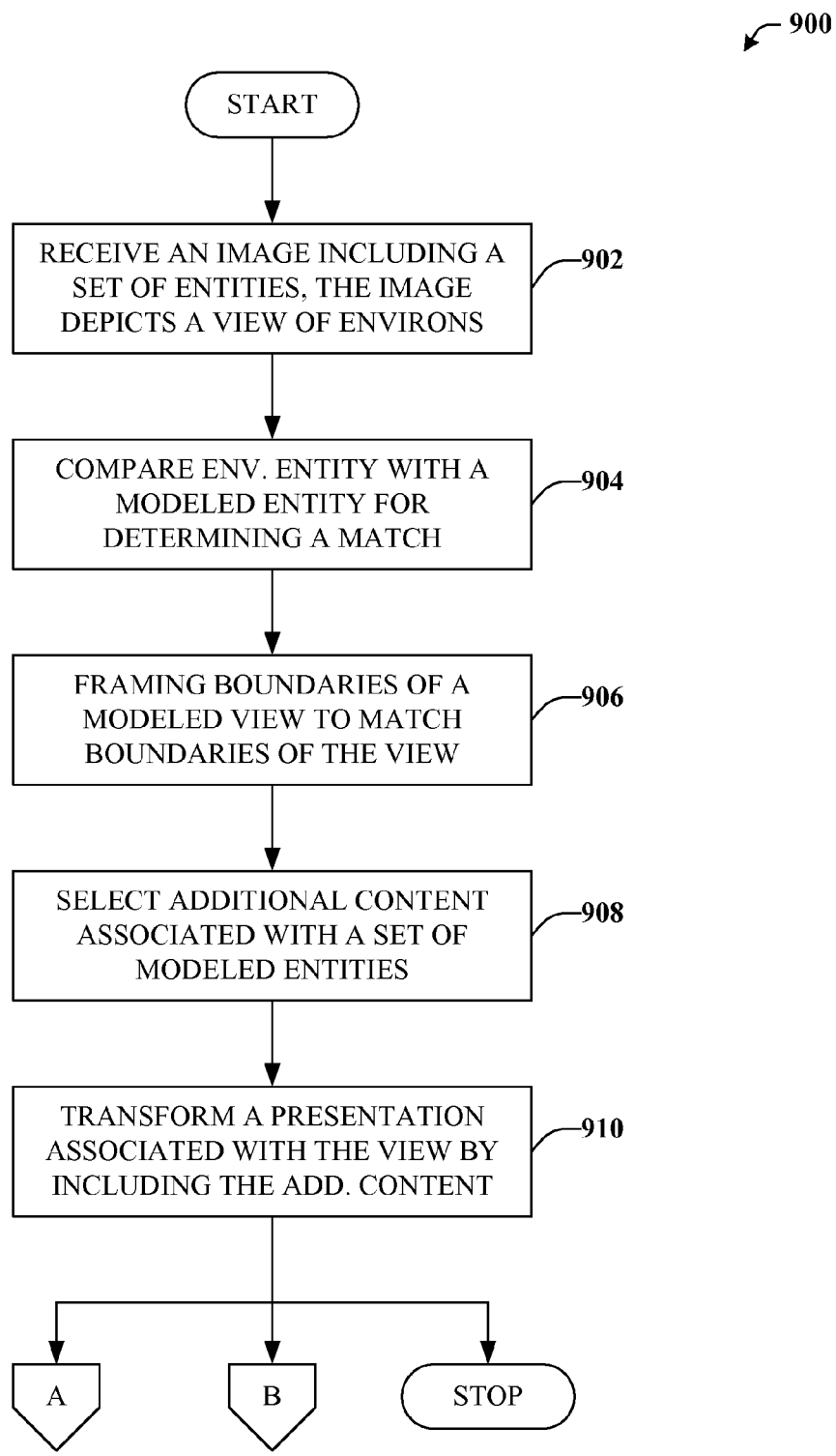
FIG. 9 depicts an exemplary flow chart of procedures that define a method for improving an experience in connection with a field of view of a local environment.
Figure 10:
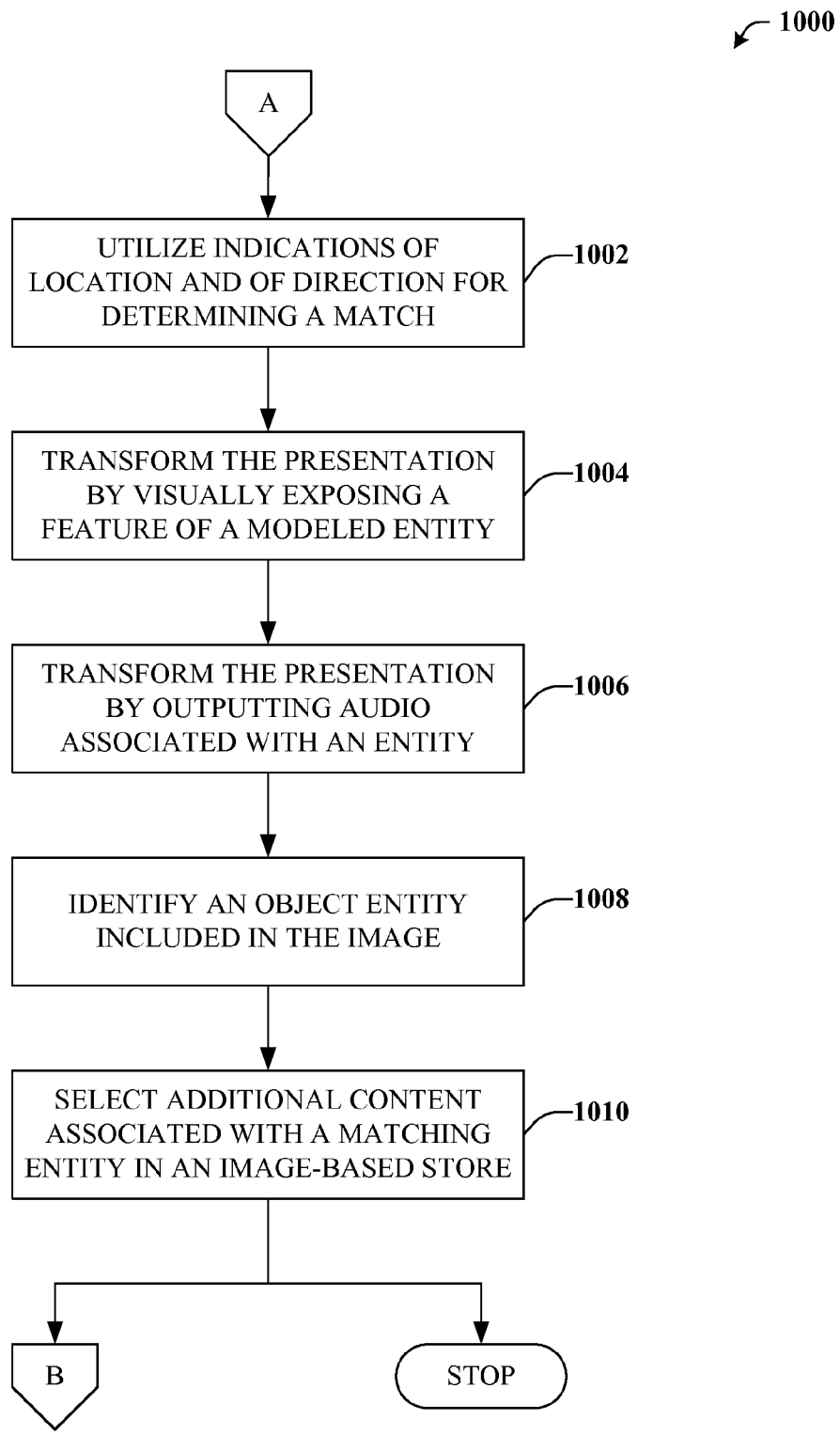
FIG. 10 illustrates an exemplary flow chart of procedures that define a method for providing additional features in connection with improving an experience in connection with a local environment.
Figure 11:
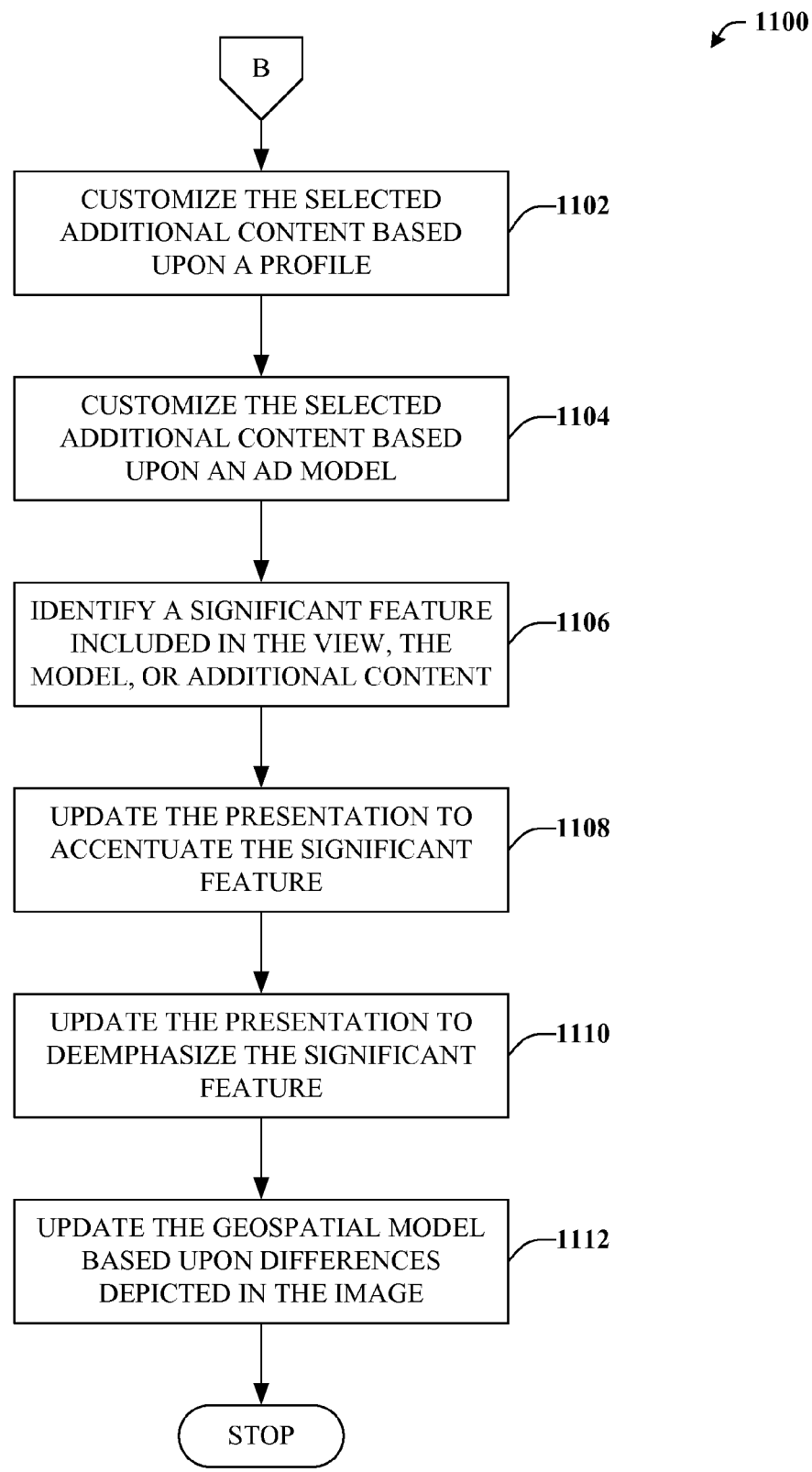
FIG. 11 is an exemplary flow chart of procedures defining a method for further customizing additional content.

FIGS. 9, 10, and 11 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 9, exemplary computer implemented method 900 for improving an experience in connection with a field of view of a local environment is illustrated. Generally, at reference numeral 902, an image including a set of entities can be received. Typically, the image will depict a view of an identifiable portion of a local environment. However, in other cases, the image can depict identifiable real entities that exist in the environment. At reference numeral 904, an environment entity included in the view can be compared to a corresponding modeled entity included in a geospatial model of the environment for determining a match.

At reference numeral 906, boundaries associated with a modeled view associated with the geospatial model can be framed to match boundaries depicted by the view based upon the comparing described at reference numeral 904. For example, as entities included in the image are correlated to associated modeled entities, the field of view of the image can be matched to a substantially identical a modeled field of view with respect to the geospatial model.

Next to be described, at reference numeral 908 additional content associated with a set of modeled entities included in the geospatial model can be selected. The additional content can relate to services or data related to one or more of the modeled entities. At reference numeral 910, a presentation associated with the view can be transformed by including the additional content with the presentation.

Referring to FIG. 10, exemplary computer implemented method 1000 for providing additional features in connection with improving an experience in connection with a local environment is depicted. At reference numeral 1002, an indication of location and an indication of direction can be utilized for determining the match. For example, the comparisons made to match entities in the image with modeled entities and to scope the correct modeled view at reference numerals 904 and 906, respectively can employ both an indication of location (e.g., to identify the particular local environment) and an indication of direction (e.g., to identify the particular view of the local environment that a user is interested). Notably, indications of location and direction can be provided in 3-D such that, e.g., location can include a height or altitude component and direction can include both panoramic and elevation angles or directions.

At reference numeral 1004, the presentation can be transformed by visually exposing a feature of a modeled entity. Likewise, at reference numeral 1006, the presentation can be transformed by outputting audio associated with a modeled entity. In either case, it should be appreciated that the modeled entity can be included in a geospatial model of the environment that is associated with an environment entity; or the modeled entity can be included in an image-based data store that is associated with an object entity that is identified at reference numeral 1008. At reference numeral 1010, additional content associated with a matching object entity can be selected, wherein the additional information is either included in or referenced by the image-based data store.

With reference now to FIG. 11, method 1100 for further customizing additional content is illustrated. Generally, at reference numeral 1102, the selected additional content can be customized based upon a profile associated with a user. For example, the profile can include can include a variety of information relating to the user (or an associated device). For instance, the profile can include preferences or defaults associated with the user, a current or recent location of the user, a current or recent transaction (e.g., a purchase, an encounter, a charitable donation, a rating, review, or other feedback, an input such as the image or view . . . ) of the user, or a history of locations or transactions. The profile can also include schedule or calendar information associated with the user or other time-related aspects, social networks, contact lists, trust relationships associated with the user, demographic data associated with the user such as age, gender, income, race, residence, or the like. In addition, the profile can include or reference data relating to hobbies, interests, viewpoints, or essentially any available information that can be employed to provide tailored additional content.

At reference numeral 1104, the selected additional content can be customized based upon an advertising model. As one example, the advertising model can allow advertisers to bid for the opportunity to have content of their own designation surfaced to the user. Such content can be appropriately limited to suitable fields of view and also further limited based upon the profile of the user as discussed at reference numeral 1102. At reference numeral 1106, a significant feature included in at least one of the view of the local environment, the local environment, the model of the environment, or the additional content can be identified.

Appreciably, the significant feature can be either a visual feature or an audio feature. Moreover, at reference numeral 1108, the presentation can be updated to accentuate the significant feature, whereas at reference numeral 1110, the presentation can be updated to deemphasize the significant feature. In another aspect, at reference numeral 1112, the geospatial model of the environment can be updated based upon differences depicted in the image vis-à-vis the associated modeled entities included in the geospatial model.

Figure 12:
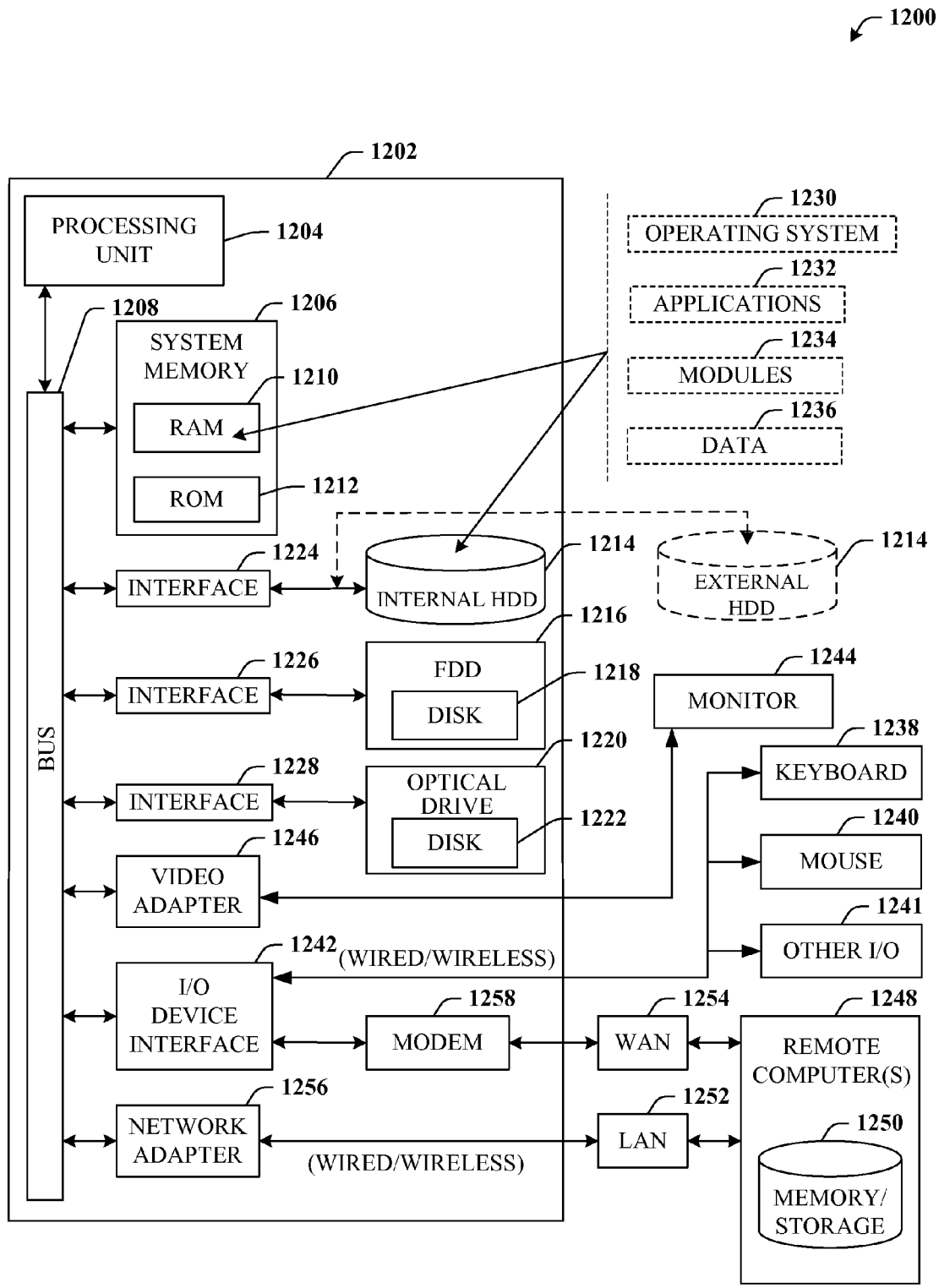
FIG. 12 illustrates a block diagram of a computer operable to execute the disclosed architecture.

Referring now to FIG. 12, there is illustrated a block diagram of an exemplary computer system operable to execute the disclosed architecture. In order to provide additional context for various aspects of the claimed subject matter, FIG. 12 and the following discussion are intended to provide a brief, general description of a suitable computing environment 1200 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the claimed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM)

1212. A basic input/output system (BIOS) is stored in a nonvolatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the claimed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices 1241 may include a speaker, a microphone, a camera or another imaging device, an IR remote control, a joystick, a game pad, a stylus pen, touch screen, or the like. These and other input devices are often connected to the processing unit 1204 through an input-output device interface 1242 that can be coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10 BaseT" wired Ethernet networks used in many offices.

Figure 13:
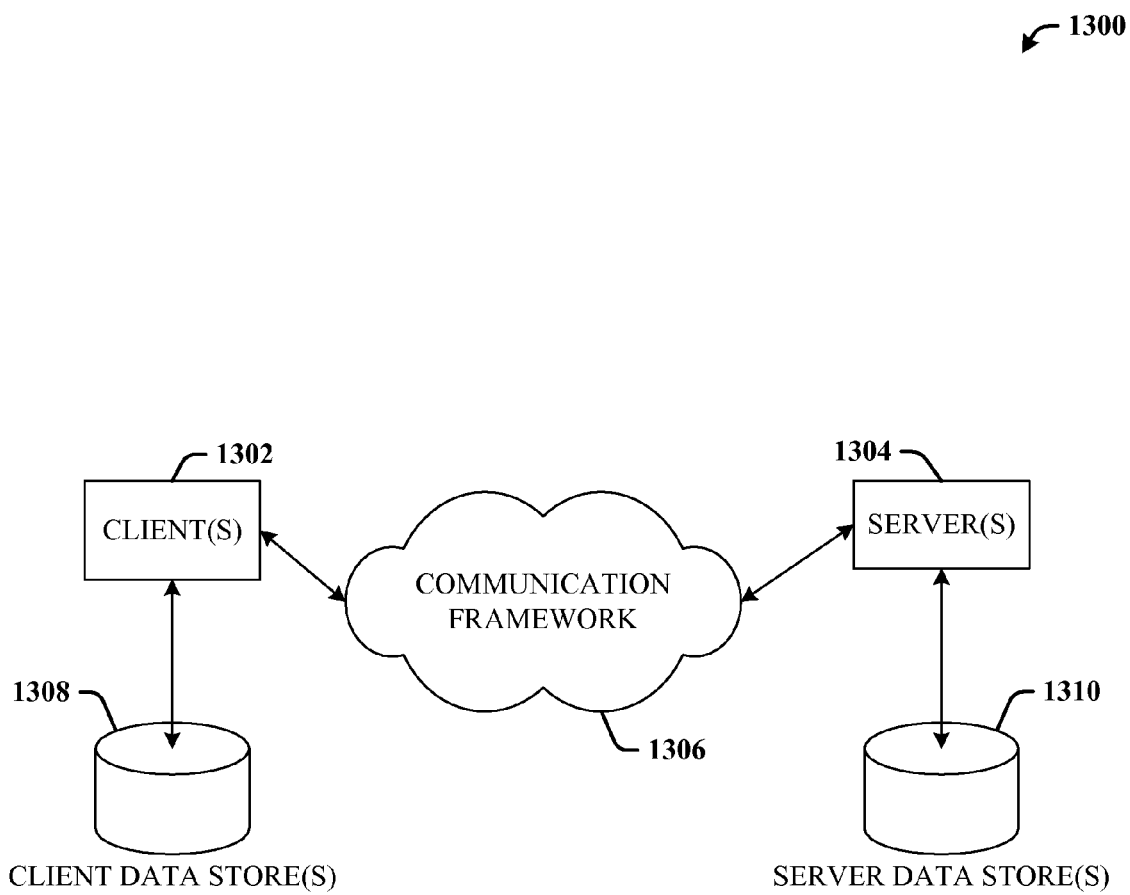
FIG. 13 illustrates a schematic block diagram of an exemplary computing environment.

Referring now to FIG. 13, there is illustrated a schematic block diagram of an exemplary computer compilation system operable to execute the disclosed architecture. The system 1300 includes one or more client(s) 1302. The client(s) 1302 can be hardware and/or software (e.g., threads, processes, computing devices). The client(s) 1302 can house cookie(s) and/or associated contextual information by employing the claimed subject matter, for example.

The system 1300 also includes one or more server(s) 1304. The server(s) 1304 can also be hardware and/or software (e.g., threads, processes, computing devices). The servers 1304 can house threads to perform transformations by employing the claimed subject matter, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system that utilizes vision-tracking to enhance an experience associated with a field of view of a local environment, comprising:
an interface component that includes a vision-tracking component that monitors the location of one or more retinas of an associated user, and translates the location of one or more retinas into gaze attributes that relate to features of one or more eyes of an associated user;
a recognition component that employs the gaze attributes, an indication of spatial location, and an indication of directional perspective to identify a modeled view of a geospatial model of a physical environment, the modeled view corresponds to a current field of view of the user in connection with the physical environment; and
an augmentation component that selects additional content associated with a modeled entity included in the modeled view, the modeled entity is included in the geospatial model or an image-based data store; and the interface component presents the additional content in a manner that is perceptible by the user.

2. The system of claim 1, the indication of location relates to a three-dimensional (3D) location of the user or an associated device.

3. The system of claim 1, the indication of perspective relates to a 3D orientation for the user or an associated device.

4. The system of claim 1, the vision-tracking component employs machine learning techniques to tailor the gaze attributes to a particular user's eye or eyes.

5. The system of claim 1, the interface component is included in whole or in part in a head set or a wearable device or unit.

6. The system of claim 1, the interface component further includes a camera that images a view of the physical environment that encompasses the current field of view of the user.

7. The system of claim 1, the interface component includes or provides at least one of a head up display (HUD) or a visual retinal display (VRD).

8. The system of claim 6, the interface component presents the additional content by way of the HUD or the VRD.

9. The system of claim 1, the recognition component further determines an object of focus based upon the gaze attributes, the indication of location, and the indication of perspective, the object of focus in an entity included in the field of view.

10. The system of claim 9, the additional content is specific to the entity or the modeled entity associated therewith.

11. The system of claim 9, the entity is an environment entity and the recognition component identifies the modeled entity included in the geospatial model that corresponds to the environment entity.

12. The system of claim 9, the additional content is an audio stream associated with the entity or the modeled entity.

13. The system of claim 9, the interface component exposes a feature of the entity or the modeled entity, the feature is occluded or non-existent in the current field of view.

14. The system of claim 9, the entity is an object entity and the recognition component identifies the modeled entity included in the image-based data store that corresponds to the object entity.

15. The system of claim 14, the object entity included in the image is a representation of at least one of a logo, a brand, or a trademark; a sign, a poster, a menu, a billboard, or an advertisement; a work with artistic, entertainment, or commercial value; a book, a compact disc (CD), a digital versatile disc (DVD), a product, or product packaging; or a residence, a public site, a commercial site, or a landmark.

16. The system of claim 1, the indication of location or the indication of perspective is determined based upon at least one of Global Positioning System (GPS), signal triangulation techniques, signal multipath fingerprinting techniques, Radio Frequency Identification (RFID), compass information, altimeter information, accelerometer information, a gyroscope or level, or a comparison of the view of the local environment with the model of the environment.

17. A computer implemented method for employing vision-tracking for improving an experience in connection with a field of view of a local environment, comprising:

employing a vision-tracking component or device for tracking a location of one or more retinas of one or more eyes of a user;

employing a processor for translating the location of the one or more retinas into a set of gaze attributes;

employing the gaze attributes, an indication of location, and an indication of direction to identify a modeled view of a geospatial model of the environment, whereby the modeled view corresponds to a current field of view of the user;

selecting additional content associated with a modeled entity included in the modeled field of view, the modeled entity is included in the geospatial model or an image-based data store; and presenting the additional content in a manner perceivable to the user.

18. The method of claim 17, further comprising at least one of the following acts:

defining the indication of location in 3D coordinates based upon a physical location of the user or an associated device;

defining the indication of direction in 3D based upon an physical orientation of the user's head or face or a device associated with the user;

employing machine learning techniques for personalizing the gaze attributes to a particular user's eye or eyes;

including the vision-tracking component in a headset or wearable device or unit;

including in the device or unit a camera for imaging a view of the physical environment that is substantially encompasses the current field of view of the user;

including in the device or unit a VRD or providing a HUD; or presenting the additional content by way of the VRD or the HUD.

19. The method of claim 18, further comprising at least one of the following acts:

determining an object of focus included in the field of view based upon the gaze attributes, the indication of location, and the indication of direction;

selecting the additional content further based upon a relationship with the object of focus;

selecting the additional content from amongst audio content associated with the object of focus or the modeled entity that corresponds therewith; or exposing a feature of the object of focus or the modeled entity associated therewith, the feature is occluded or non-existent in the current field of view.

20. A computer implemented system that utilizes vision-tracking to enhance an experience associated with a field of view of a local environment, comprising:

an interface component that includes a vision-tracking component that monitors one or more retinas of a user to determine gaze attributes;

a recognition component that employs the gaze attributes, an indication of spatial location, and an indication of directional perspective to identify a modeled view of a geospatial model of a physical environment, the modeled view corresponds to a current field of view of the user in connection with the physical environment;

an augmentation component that selects additional content associated with a modeled entity included in the modeled view, the modeled entity is included in the geospatial model; and a virtual retina display that draws a raster display on the eye of the user, the raster display comprising the additional content and the modeled entity.

* * * * *